United States Patent [19]
Frisbie et al.

[11] Patent Number: 5,321,615
[45] Date of Patent: Jun. 14, 1994

[54] ZERO VISIBILITY SURFACE TRAFFIC CONTROL SYSTEM

[76] Inventors: Marvin E. Frisbie, 9652 Mariella Dr., #72,, Lakeside, Calif. 92040; Wilber H. Bailey, 1015 Hymettus Ave., Leucadia, Calif. 92024

[21] Appl. No.: 988,812

[22] Filed: Dec. 10, 1992

[51] Int. Cl.⁵ .......................... G06F 15/50; G01S 1/16
[52] U.S. Cl. .............................. 364/424.02; 364/439; 340/948
[58] Field of Search .......... 364/439, 440, 441, 424.02; 340/947, 948, 951, 952, 981

[56] References Cited

U.S. PATENT DOCUMENTS

| | | | |
|---|---|---|---|
| 3,258,744 | 6/1966 | Auer, Jr. | 340/37 |
| 3,258,745 | 6/1966 | Auer, Jr. | 340/37 |
| 3,706,969 | 12/1972 | Paredes | 340/26 |
| 3,855,571 | 12/1974 | Massa | 340/26 |
| 3,872,474 | 3/1975 | Levine | 343/108 R |
| 3,971,025 | 7/1976 | Levine | 343/108 R |
| 4,247,896 | 1/1981 | Schnaibel | 364/436 |
| 4,333,147 | 6/1982 | Regueiro et al. | 364/436 |
| 4,516,125 | 5/1985 | Schwab et al. | 343/7.7 |
| 4,577,140 | 3/1986 | Schmidt et al. | 318/587 |
| 4,590,471 | 5/1986 | Pieroway et al. | 340/948 |
| 4,706,198 | 11/1987 | Thurman | 364/439 |
| 4,791,570 | 12/1988 | Sherman et al. | 323/210 |
| 4,845,629 | 7/1989 | Murga | 364/439 |
| 4,987,540 | 1/1991 | Luke, Jr. | 364/424.02 |
| 4,999,782 | 3/1991 | Bevan | 364/448 |
| 5,029,294 | 7/1991 | Kim | 340/988 |
| 5,057,835 | 10/1991 | Factor et al. | 340/995 |
| 5,075,853 | 12/1991 | Luke, Jr. | 364/424.02 |

Primary Examiner—Thomas G. Black
Assistant Examiner—Tan Q. Nguyen
Attorney, Agent, or Firm—Thomas J. Tighe

[57] ABSTRACT

Guide elements along paths and turns of a network emit guide signals for guiding vehicles along the paths and through the turns. Control elements, located at points in the network at which the locomotion of approaching vehicles may need to be controlled, emit control signals, such as "stop" and "start" signals. The signals are preferably various modulated and unmodulated sine waves having frequencies programmable by a system supervisor that sends itineraries to vehicles prescribing their respective travel routes, each itinerary containing at least a set of identifiers uniquely corresponding to the signals emitted along the paths and turns in a travel route. The order of the set indicates the order of paths and turns to be taken while travelling a route. A system interface, hosted by each vehicle, acquires itineraries pertaining to its host vehicle and provides path/turn information to a vehicle driver—a person or an apparatus. The interface also determines magnitude and direction of any vehicle deviation from a guide element the interface is monitoring and reports same to the driver; recognizes and reports control signals to the driver; and detects transition points at which its host vehicle should go from one path/turn to another path/turn and indicates any needed course corrections to the driver. Sensors along paths and turns detect the proximity of a vehicle or such to it and report same to the supervisor. Optionally vehicles send their respective identification codes to the supervisor via each sensor they encounter.

31 Claims, 10 Drawing Sheets

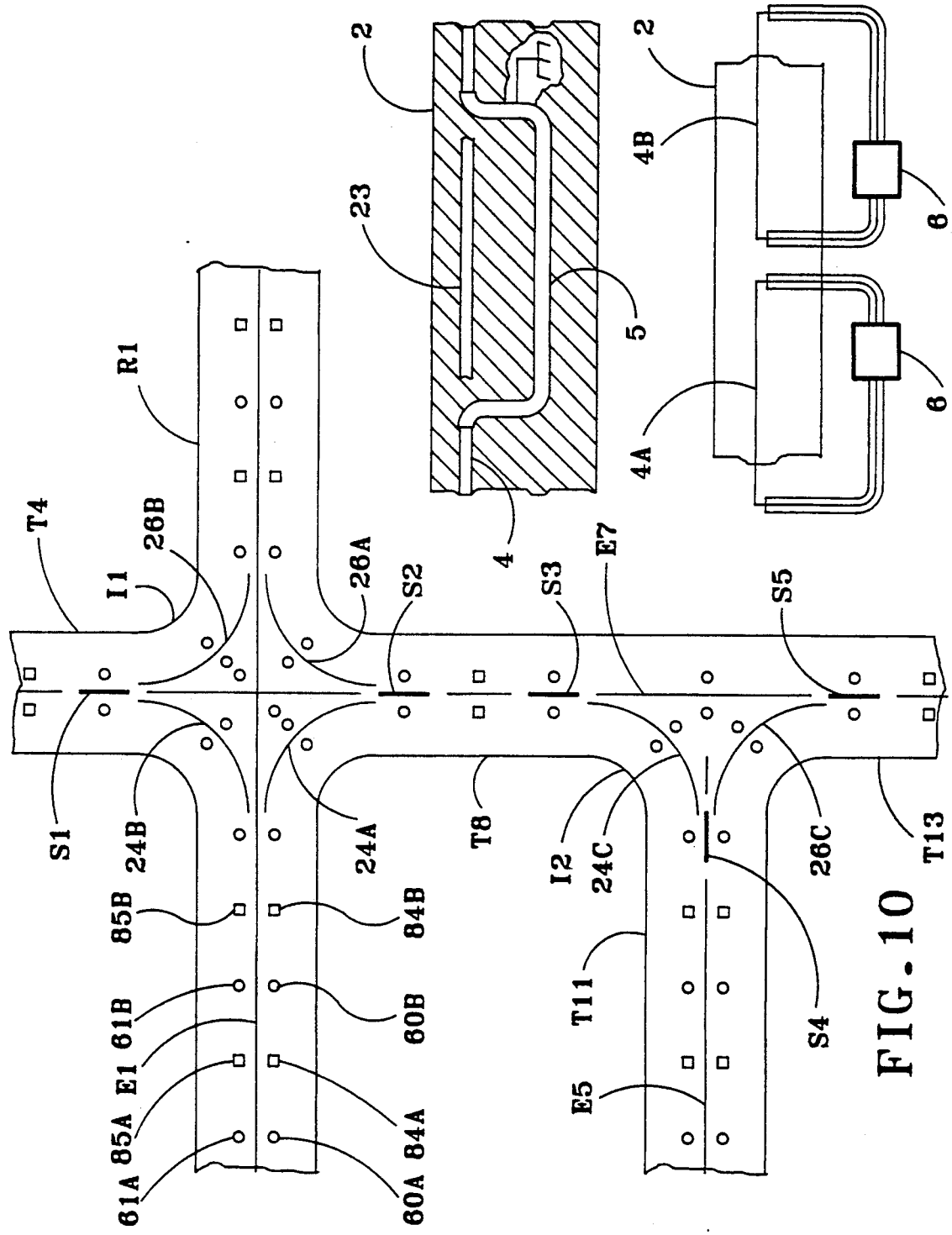

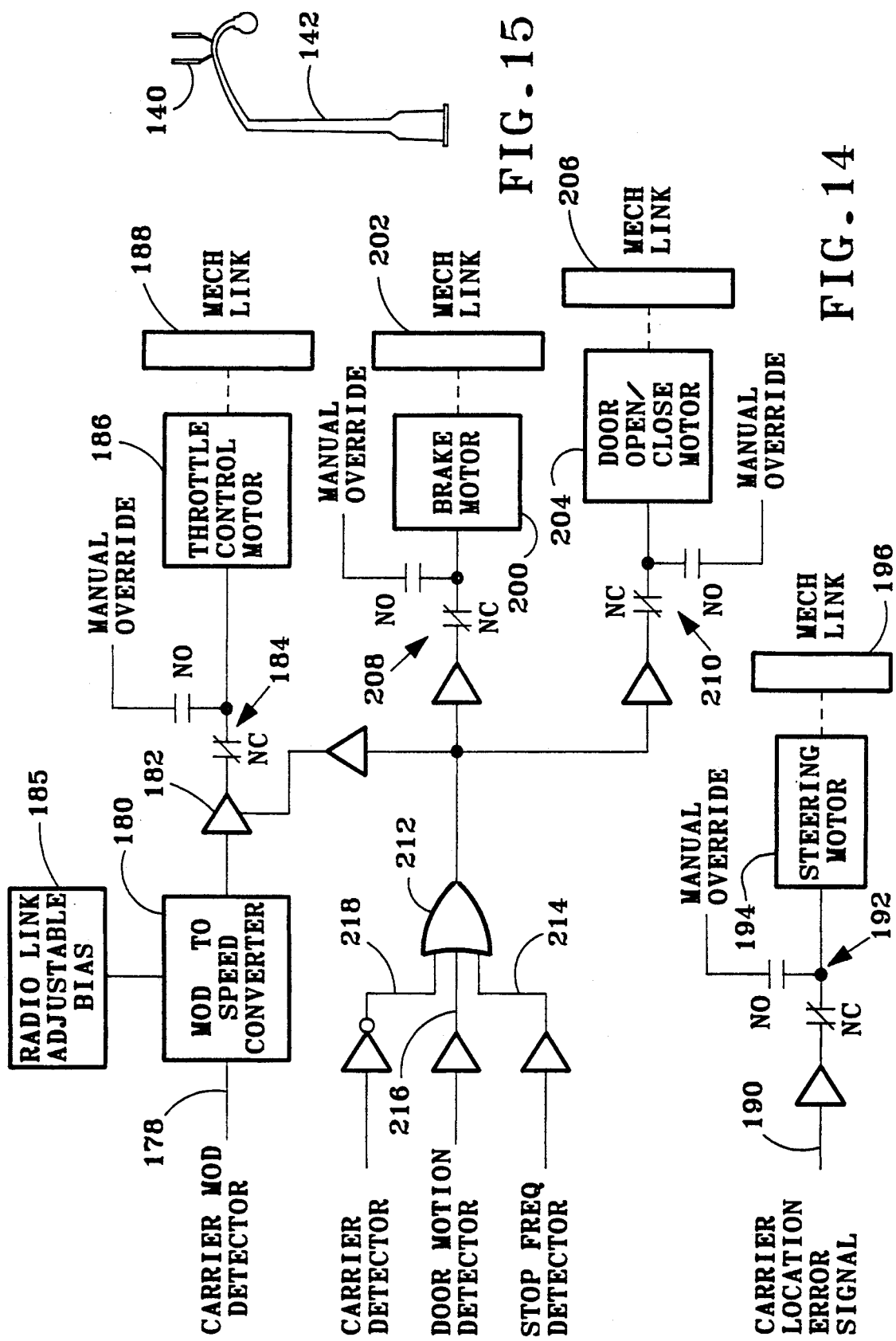

ZERO VISIBILITY SURFACE TRAFFIC CONTROL SYSTEM

BACKGROUND OF THE INVENTION

This invention relates in general to systems by which a plurality of surface travelling, self-propelled vehicles can be simultaneously guided over various paths of travel and be controlled by a supervising means at least to the extent that they can be made to stop at intersections of such paths when necessary to avoid collisions, and in particular to such systems, if any, using linear and curvilinear elements on or embedded in the paths to radiate guide and control signals to the vehicles, and using distributed proximity sensors to provide vehicle location information to the supervising means.

It has long been apparent that a system for guiding the travel of surface vehicles, such as landed airplanes and support vehicles in an airport environment and vehicles traveling on streets would be advantageous, especially in conditions of zero or near zero visibility. The need for such a system to control ground traffic on runways and taxiways of airports has been dramatically emphasized by recent collisions between airplanes caused by one of the airplanes being at an improper location and the control tower not being aware of the situation. If the airports involved had a system whereby control personnel at any time knew the precise locations of all the vehicles on the ground, these collisions could have been avoided.

The previously discussed system can also be advantageously applied to city street environments to automate the travel, and optionally the operation, of vehicles such as buses within predetermined networks of travel. The buses can be guided and controlled to automatically and continuously travel in circuitous routes throughout their respective networks to carry passengers from one point in the network to another point in the network.

Other advantages and attributes of this invention will be discussed or readily discernable upon the reading of the text hereinafter.

SUMMARY OF THE INVENTION

An object of this invention is to provide a system by which a plurality of surface travelling, self-propelled vehicles can be simultaneously guided over various paths of travel and be controlled by a supervising means at least to the extent that they can be made to stop at intersections of such paths when necessary to avoid collisions.

A further object of this invention is to provide a system such as described in the preceding paragraph which also includes a plurality of sensors distributed at distance intervals along the various paths of travel providing input to the supervising means to keep it informed of the locations of the vehicles, each sensor being capable of detecting the presence of a nearby vehicle and contemporaneously reporting the presence to the supervising means.

A further object of this invention is to provide a system such as described in the two preceding paragraphs in which the vehicles can detect when they are within the sensing range of a sensor and in response thereto transmit a signal containing certain information, e.g. predetermined unique identification codes, and in which the sensors are also capable of receiving the signal and transferring the information contained therein to the supervising means.

A further object of this invention is to provide a system such as described above in which the vehicles are guided by linear and curvilinear radiating elements, each path distinguished by the frequency at which its element radiates, and in which vehicles can receive a travel itinerary, for example by an over-the-air RF transmission, containing at least a sequence of frequencies to indicate to the vehicle which paths and in what order the vehicle is to take.

A further object of this invention is to apply such previously described systems to airports in order to allow the pilot of the aircraft to be completely aware of where his aircraft is on the ground, and give him enough information to allow him to safely drive to the proper passenger gate, or to allow him to leave the passenger gate and safely drive to the proper runway and take off.

A further object of this invention is to apply such previously described systems to airports in order to give a ground traffic controller, i.e. supervisor, in an airport tower complete and current information as to the exact location of each aircraft that is on the ground and each support vehicle, moving and stationary, and also to give the ground controller complete control of all intersections of runways, taxiways, and intersections of taxiways with runways.

A further object of this invention is to apply such previously described systems to airports in order to provide means for tracking radar invisible craft, such as ultra light and stealth aircraft, that may be on the ground, intentionally or not, such as by a forced landing.

A further object of this invention is to apply such previously described systems to city streets in order to automate passenger buses such that the buses automatically travel prescribed routes, obeying traffic signals, and automatically pick up and drop off passengers at prescribed bus stops along the routes.

A further object of this invention is to provide a system for simultaneously guiding and controlling the travel of a plurality of self-propelled vehicles over respective, prescribed travel routes within a network of predetermined paths of travel.

A further object of this invention is to provide a system for "stacking" (as explained in the specification) landed aircraft along runways and/or taxiways when necessary, e.g. in the event of an accident closing an active runway.

These and other objects which will become apparent from a reading of the text hereinafter are accomplished by a system comprising; (1) a path guide means, positioned along each path, for emitting signals to guide vehicles along the path, (2) turn guide means, positioned along each turn, if any, leading from one path onto another path, for emitting signals to guide vehicles through the turn, (3) a plurality of locomotion control means, each disposed at point in a path at which the locomotion of approaching vehicles may need to be controlled, for emitting signals to control said locomotion, (4) a system supervisor, and (5) a system interface hosted by each vehicle being guided and controlled. The system supervisor has at least means for sending itineraries to the vehicles prescribing their respective travel routes and means for selectively causing the locomotion control means to emit, when suitable, at least a stop signal. Preferably each itinerary comprises an ordered set of identifiers each of which corresponds to the signal emitted along a path or a turn in a travel route prescribed by the itinerary, the order of the set indicating the order of paths and turns,, if any, in the travel route. The system interfaces each basically comprise: (1) means for acquiring itineraries pertaining to the host vehicle sent by the system supervisor, (2) means for indicating to a host vehicle driver the set of identifiers contained in each acquired itinerary and the order of the set, (3) means, responsive to the signals emitted by path guide means, for indicating to the driver the position of the host vehicle relative to said path guide means, (4) means, responsive to the signals emitted by turn guide means, for indicating to the driver the position of the host vehicle relative to said turn guide means, and (5) means, responsive to stop signals, for indicating to the driver that the host vehicle should be stopped. The driver can be a person, such as a pilot, and the indications can be made via combinations of visual displays audio indicators, or the driver can be a programmed apparatus and the indications made in a form recognizable by the apparatus.

The system interface can further comprise means for detecting each point of transition at which a host vehicle should go from one path or turn to another path or turn along a travel route, and means, responsive to a detection of a transition point, for indicating a change, if any, required in the course of the host vehicle to follow the other path or turn.

Preferably the system also has a plurality of proximity sensors distributed in spaced relation along all or at least some of the paths and turns in the network, each sensor f or detecting the proximity of a vehicle or other object to it. When detections are made the sensors so inform the system supervisor by contemporaneous signals sent via a common communication bus. These detections help to keep the system supervisor informed of the presence of objects on the sensed paths and turns and the progress of vehicles along them primarily in order to avoid collisions.

The system interface preferably also has means for detecting when the host vehicle is generally within the sensing range of a proximity sensor and, in response thereto, for transmitting a signal to the sensor corresponding to an identification of the host vehicle; and correspondingly the sensor also has means for receiving the identification signal and means for contemporaneously communicating the vehicle's identification to the system supervisor. The system supervisor uses the vehicle identification information received from the sensors to individually monitor the positions and progress of vehicles travelling the network.

BRIEF DESCRIPTION OF THE DRAWINGS

FIG. 10 is a detail view of two intersections of the airport of FIG. 7 illustrating, among other things, a preferred distribution of the two types of proximity sensors and start/stop radiating elements according this invention.

FIG. 11 is a sectional view illustrating a preferred, but one of several alternatives, disposition of a locomotion control radiating element, in this case a start/stop element, in relation to a radiating guide element.

FIG. 12 is a sectional view illustrating an alternative embodiment of a guide element.

FIG. 14 is a functional block diagram of a complementary system for automatically operating the controls of passenger buses to guide and control them over the prescribed routes as illustrated in FIG. 13.

FIG. 15 is an elevational view of a capacitive sensor calibration device mounted on a street lamp post.

DESCRIPTION ON THE PREFERRED EMBODIMENT

Figure 1:
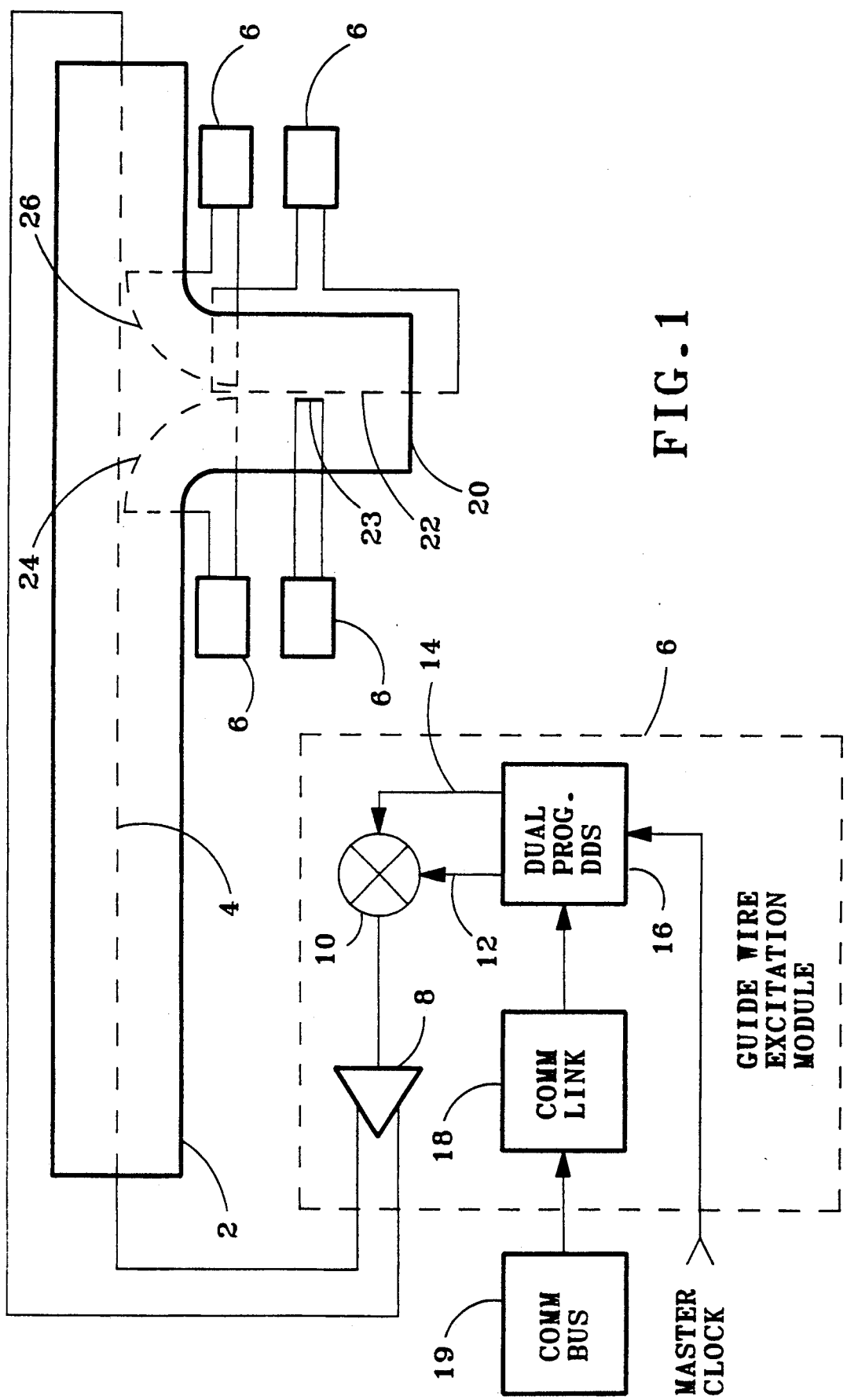
FIG. 1 is a combination block diagram and plan view illustrating linear and curvilinear guide elements for radiating guide signals and their associated excitation modules installed in a simple network of paths and turns, according to this invention.

Referring to FIG. 1, an embodiment of this invention as applied to a simple network of airport vehicle travel paths is illustrated. One path, a runway 2, is illustrated as having a laterally centered, linear guide element 41 such as a wire antenna, generally coextensive with the runway and embedded in or buried beneath it. As will be more fully explained, a sine wave signal of constant rms current in the guide element causes a magnetic field to radiate from it. The magnetic field is used to guide surface vehicles, including landed aircraft, along the runway. As illustrated the guide element is driven by an excitation module 6 which basically comprises an amplifier a which preferably provides constant rms current corresponding to signals from a modulator 10 which can receive two distinct frequencies, a carrier frequency 12 and a second frequency 14, if desired, which can be used to modulate the carrier frequency. The carrier frequency and the modulating frequency, if any, are sourced by preferably a dual output, programmable, direct digital frequency (DDS) synthesizer 16. A master clock is provided to the frequency synthesizer for use in generating the carrier and modulating frequencies. The guide element excitation module also comprises a communication link 18 by which a system supervisor can communicate frequency setting information to the programmable frequency synthesizer via a communication bus 19 common to all excitation modules. In this way, a system supervisor can select both the carrier frequency and the modulating frequency within suitable ranges. Once programmed, the guide element carrier frequency, and modulation frequency, if any, remains set until reprogrammed by the system supervisor.

Referring again to FIG. 1, a second path, a taxiway 20, is also illustrated to contain a centered linear guide element 22. This guide element is energized by a second excitation module 6. Also illustrated are two turns in opposite directions from the taxiway onto the runway containing third and fourth guide element excitation modules which energize first and second, respectively, curvilinear guide elements 24 and 26, for guiding vehicles through the turns.

In operation, the four separate guide elements illustrated, 4, 22, 24 and 26, are basically antennae and can be used to guide a surface vehicle from the runway through a turn onto the taxiway, or visa versa in either direction. For most applications they can be excited by as little as one-half to one watt. It should be noted, that these four guide elements can have separate and distinct carrier frequencies, the same carrier frequency but modulated distinctively, or any variation thereof.

In any network having intersecting paths it is necessary to have means for controlling traffic at intersections to avoid collisions, and since it is normal for traffic on the runway to have priority over traffic crossing or entering the runway via a taxiway, it is necessary to provide at least a "stop" signal at intersections of taxiways with runways. It is also preferred to have at least a stop signal at intersections of taxiways with taxiways. The stop signals are used to at least halt vehicles prior to entering an intersection when doing so could cause a collision.

An example of such a means is illustrated in FIG. 1 as a stop antenna 23 embedded in or on the taxiway 20 near its intersection with the runway 2. This stop antenna can be excited by means functionally identical to a guide element excitation module 6. Preferably two signals, e.g. two distinct frequencies, are alternatively transmitted by the stop antenna, a "stop" signal and a "start" signal. These can be set and changed by the system supervisor via communications link 18 and the programmable frequency synthesizer 16. The stop antenna can be suitably disposed alongside the taxiway guide element, but FIG. 11 illustrates an alternative arrangement in which the stop antenna is aligned with a guide element 4 which takes a jog around the stop antenna. Moreover, as illustrated in FIG. 11 the portion of the guide element that jogs around the stop antenna is preferably shielded by a coaxial grounded shield 5 to minimize interference between them.

In the preferred embodiment, the guide element for each runway, taxiway or turn will operate on a common carrier frequency but will be amplitude modulated with sine waves of frequencies unique for each runway, turn and taxiway. The frequencies used should have wavelengths much longer than the effective antenna length of the guide element. This is to minimize the amount of signal radiated outside the network. Other modulation methods are possible such as frequency modulation, single sideband or pulse code. These modulation methods are more complex and offer little or no advantage over amplitude modulation.

Figure 2:
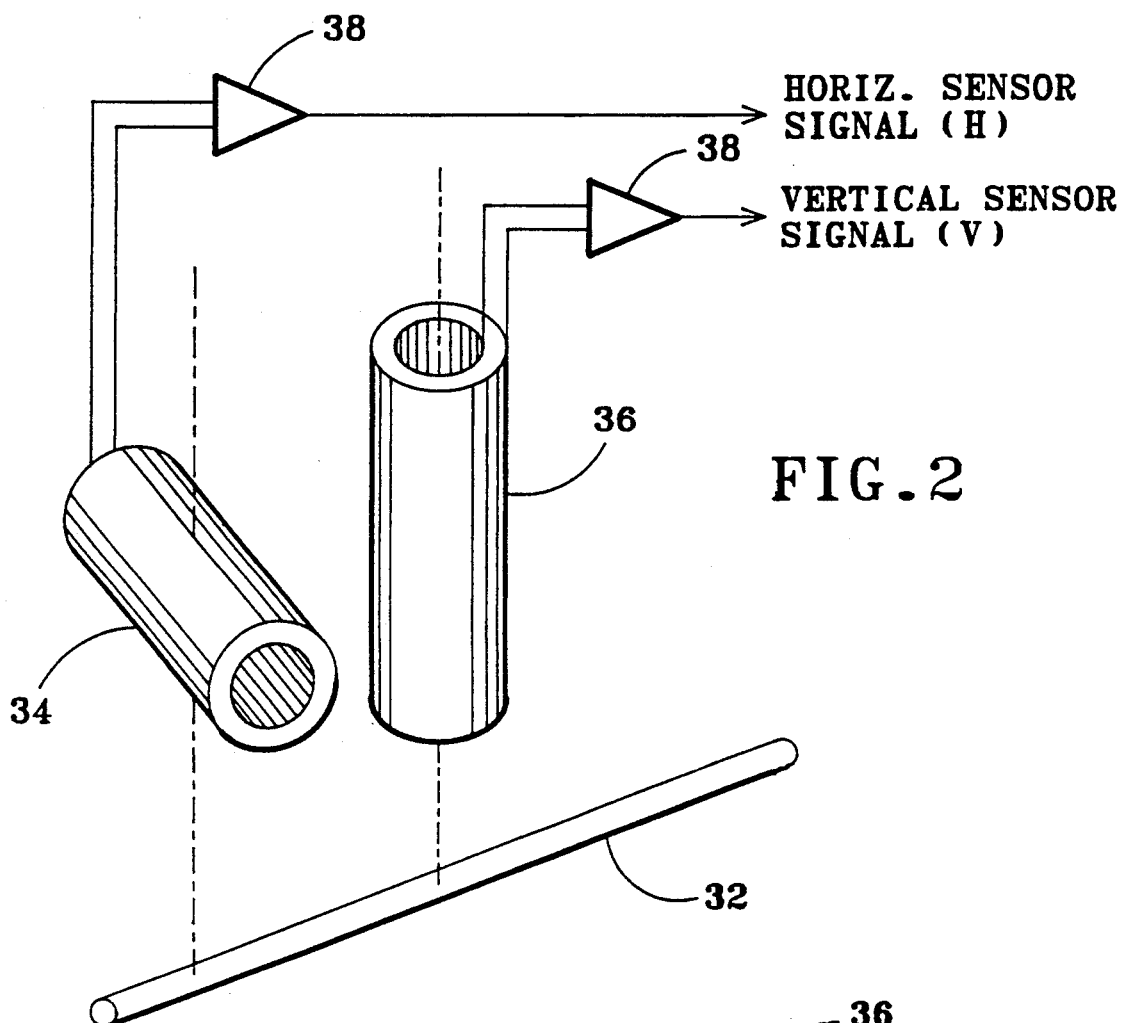
FIG. 2 is a pictorial/schematical representation of an antenna according to this invention that is mounted in or on a surface travelling vehicle for sensing signals radiated by guide and locomotion control elements.
Figure 3:
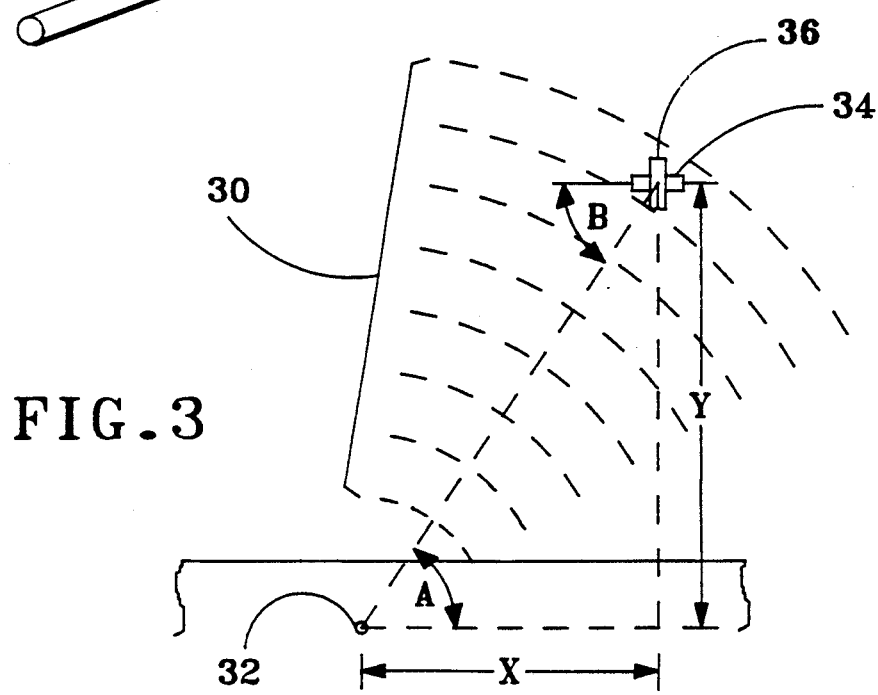
FIG. 3 is a diagrammatical representation of a method for using the antenna of FIG. 2 to follow guide element signals, according to this invention.

Referring to FIGS. 2 and 3, the means by which a surface traveling vehicle can sense its position relative to a guide element is illustrated. Preferably each vehicle will have a guide signal sensor comprising at least two orthogonal means for sensing the magnetic field 30 emanating from a segment of guide element 32 within the range of the sensor. A suitable guide signal sensor can be a combination of a horizontally oriented coil 34 and a vertically orientated coil 36. Preferably these coils are as close together as practical and are located in or on a host vehicle such that when the vehicle is centered directly over and aligned with the guide element, the sensor is at "dead center" with respect to the guide element, i.e., the horizontal coil is centered length-wise directly over the guide element with its longitudinal axis substantially orthogonal to the guide element and the vertical coil is centered end-wise directly over the guide element with its longitudinal axis substantially orthogonal to and intersecting the guide element. Associated with each coil for generating a signal proportional to the current induced therein is a preamplifier 38.

As illustrated in FIG. 2, the orthogonal coil sensor's dead center position over the guide element segment 32 is pictorially illustrated. In practice the change of angle per unit distance in any curve of a guide element, even in turns, can be kept small enough to make any segment of the guide element within range of a guide signal sensor appear linear, and so the magnetic field emanating from such a segment will have substantially circular lines of force concentric with the segment. At dead center over the guide element, the horizontal coil will have the maximum current induced therein by the concentric field, and the vertical coil will have the minimum current induced therein because it will essentially be at a null point with respect to the magnetic field. FIG. 3 illustrates the guide signal sensor offset to one side of the guide element, as would be the case when the host vehicle deviates to the side. At this offset position, the strength of the signal ("H") produced by the horizontal coil will have decreased and the strength of the signal ("V") produced by the vertical coil will have increased. As the sensor is laterally offset from dead center, the V signal will increase in strength until it peaks at a position about 45° from dead center while the H signal strength will decrease from its maximum at dead center. As the guide signal sensor moves from one side of dead center to the opposite side and vice versa, the phase of the H signal will not change but the phase of the V signal will shift plus or minus 180°. The phase shift provides information as to the direction of deviation from the center of the guide element.

Referring again to FIG. 3, the geometry involved in calculating the magnitude of a deviation is illustrated. Since the magnetic field lines are generally circular, the angle at which the field intersects the sensor coils is angle "B". It can been seen that angle "B" is the complement of an angle "A" of the right triangle describing the guide element to sensor relationship, i.e. $A = 90° - B$. Therefore the ratio of the H and V signals will generally correspond to the cotangent of angle B which is equal to X/Y. Since the vertical distance "Y" to the guide element should be known, for a substantially level path, the amount of deviation "X" can easily be solved by the following equation: $X = Y(H/V)$.

Figure 4:
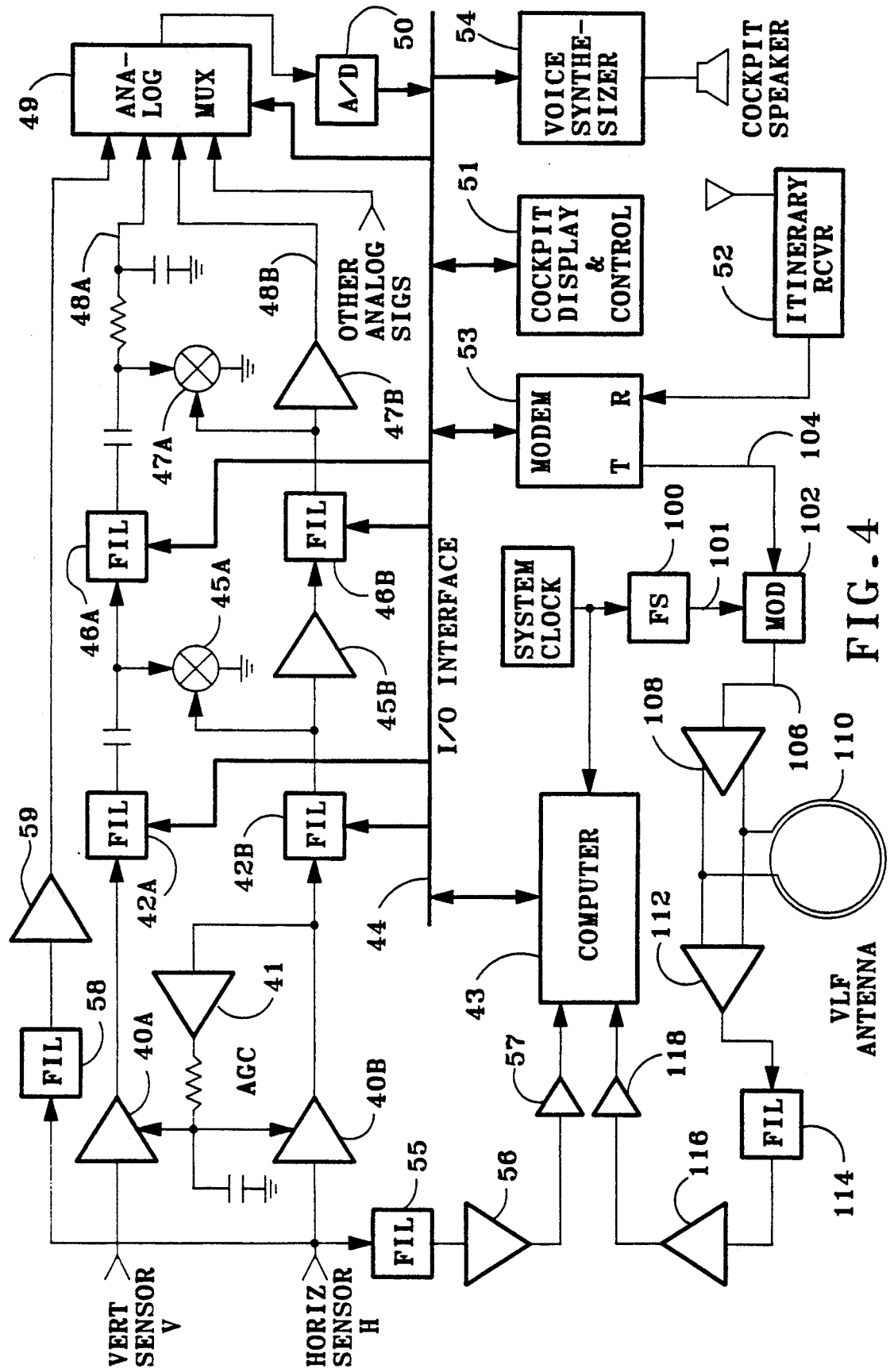
FIG. 4 is a block diagram of the electronics associated with the antenna of FIG. 2 and the method of FIG. 3 preferably located in the driver's compartment, e.g. the cockpit, of a surface travelling vehicle.

Referring to FIG. 4, illustrated is an embodiment of the means by which the horizontal and vertical signals, H and V respectively, from a vehicle's guide signal sensor are processed to enable the vehicle to accurately follow guide elements of various frequencies. Variations in the strength of signals sensed from guide elements are such that, over the useful detection range, automatic gain control (AGC) amplification is required, and so the vertical and horizontal signals, V and H, are communicated to an AGC circuit illustrated as a pair of signal amplifiers, 40A and 40B, the gains of which are controlled by a gain control amplifier 41. The gain control amplifier derives its control signal from the horizontal signal channel, or H channel. This control signal is applied to both the H channel and the vertical signal channel, or V channel, in order to preserve the ratio between the signals. The outputs of the signal amplifiers are communicated to a first pair of programmable bandpass filters, 42A and 42B. The pass bands of the filters are programmed by a computer 43 via an input/output (I/O) interface 44 and are generally centered around the carrier frequency that the computer is seeking or following according to an itinerary sent to the computer by the system supervisor.

Referring again to FIG. 4, the filtered signal outputs of the first pair of bandpass filters, 42A and 42B, are communicated to two carrier detectors, 45A and 45B respectively. The carrier detector 45B in the H channel can be a conventional rectifying detector, but the V channel detector 45A is preferably a synchronous demodulator using the H channel carrier signal as a reference in order to preserve the phase relationship between the signals in the two channels. The outputs of the carrier detectors are communicated to a second pair of programmable bandpass filters, 46A and 46B respectively. These filters serve to extract frequencies, if any, that are modulating the carrier frequency. The pass bands of the filters are programmed by the computer 43 via the I/O interface 44 and are generally centered around a modulation frequency that the computer is seeking or following.

Referring again to FIG. 4, the filtered signal outputs of the second pair of bandpass filters, 46A and 46B, are communicated to two modulation detectors, 47A and 47B respectively. The modulation detector 47B in the H channel can be a conventional rectifying detector, but the V channel detector 47A is preferably a synchronous demodulator using the H channel modulation signal as a reference in order to preserve the phase relationship between the two channels. The H and V channel outputs, 48A and 48B respectively, are substantially two analog voltages that represent the position of the sensors relative to a guide element, and both are communicated through an analog signal multiplexer (MUX) 49 to an analog to digital (A/D) converter 50. The A/D in turn communicates corresponding digital signals to the computer via the I/O interface for processing by the computer. Based on information it receives from the H and V channels, the computer communicates corresponding display signals to a control and display panel 51 via the I/O interface. The information displayed is indicative of at least the relative position of the host vehicle to the guide element it is following, and from this information a driver or pilot can make course corrections, if necessary, to accurately follow the guide element.

Referring again to FIG. 4, the computer receives its itinerary from the system supervisor in the form of a broadcast RF signal. Each such signal contains at least a hailing code signifying the intended recipient of the message and an itinerary. Each system interface could have a unique address in which case the hailing code could simply be the address of the system interface that is the intended recipient. An RF receiver 52 picks up the RF signal and communicates it to a modem 53 which demodulates it and converts it to corresponding digital signals. The RF receiver may be a special purpose receiver but a preexisting voice RF receiver can also be used since it is well known to communicate data over a voice channel by a variety of available keying techniques. The modem communicates the digital signals to the computer via the I/O interface 44. The computer then checks the hailing code to see if it was the intended recipient of the itinerary, and if so the computer stores the itinerary for subsequent use in providing steering indications to the host vehicle's driver. The complete travel route of the vehicle is sent in preferably a data burst comprising an ordered set of carrier and modulation frequencies, if any, which correspond to paths and turns the vehicle should seek and follow.

After receiving an itinerary, the computer selectively programs the H and V channel filters to tune the channels according to the first item (frequency and/or modulation) on the itinerary. Preferably the first item corresponds to the guide element of the path or turn the vehicle is on when it receives the itinerary. Thereafter the computer generally keeps the H and V channels tuned according to the first item so that it can continuously monitor H and V channel signals and appropriately indicate to the driver when deviations from the current guide element occur. However, in order to recognize a transition point at which the vehicle should stop following the current guide element and start following the next guide element, as indicated by the second item on the itinerary, the computer periodically samples for the next guide element. The computer does this by tuning periodically and for brief periods the H and V channels according to the second item. Sampling continues until the computer detects the frequency and/or modulation of the next guide element (the second item on the itinerary), after which it keeps the channels tuned according to the second item except for periodic sampling for the frequency and/or modulation according to the third item on the itinerary. In this way the computer detects each transition point along the travel route. In general, the computer selectively programs the filters of the H and V channels to continuously monitor the frequency and/or modulation of the current guide element except for periodic brief periods when the computer samples for the frequency and/or modulation of the next guide element indicated by the itinerary. In this fashion the vehicle is guided through the paths and turns, from one path onto another, of a travel route defined by the itinerary. For an aircraft, it preferably receives its itinerary prior to landing and the first item on the itinerary corresponds to the runway upon which it lands.

Any course changes needed at a transition point in order for the host vehicle to switch from following one path or turn to following a second path or turn can be derived the same way the computer determines the vehicle's deviation from a guide element. At a transition point, the new path or turn becomes the current path or turn and if the vehicle continues to follow the old path or turn, a deviation from the current (new) path or turn will be indicated. The driver in correcting for this indicated deviation will in effect be altering the course of the vehicle to follow the new path or turn.

The computer also receives control signals from the control and display panel 51. These control signals derive from conventional manual controls. This is advantageous, particularly in a situation where an itinerary must be manually entered into the computer 43. The computer can also communicate with a pilot or driver by a voice synthesizer 54 driving a speaker. For example, the computer can inform the driver in advance of a turn, such as, "Right-hand turn 50 feet ahead."

The horizontal coil of FIG. 2 is preferably used as an antenna to receive the start and stop signals from the stop antennas 23 (FIG. 1). It is preferred over the vertical coil because it does not have a potential null point as does the vertical coil. Referring to FIG. 4, a stop signal received by the horizontal coil is communicated to a bandpass filter 55 which isolates the stop frequency and communicates it to a detector 56. The output of the detector is communicated to a Schmidt-trigger amplifier 57 the output of which is communicated to the computer as preferably a highest priority interrupt. The computer then communicates the stop condition to the pilot or driver via the cockpit display, and preferably the voice synthesizer. The stop condition preferably persists until the module exciting the stop antenna changes in frequency from the stop frequency to the start frequency. Again, the horizontal coil receives this start frequency and communicates it to a start frequency bandpass filter 58 which in turn isolates the start frequency and communicates it to a start frequency detector 59 the output of which is communicated to one of the inputs of the analog multiplexer 49. Since the presence of a start frequency is not as critical as the presence of a stop frequency, the computer learns of the presence of the start frequency through its normal course of polling analog information provided via the analog multiplexer.

Figure 5:
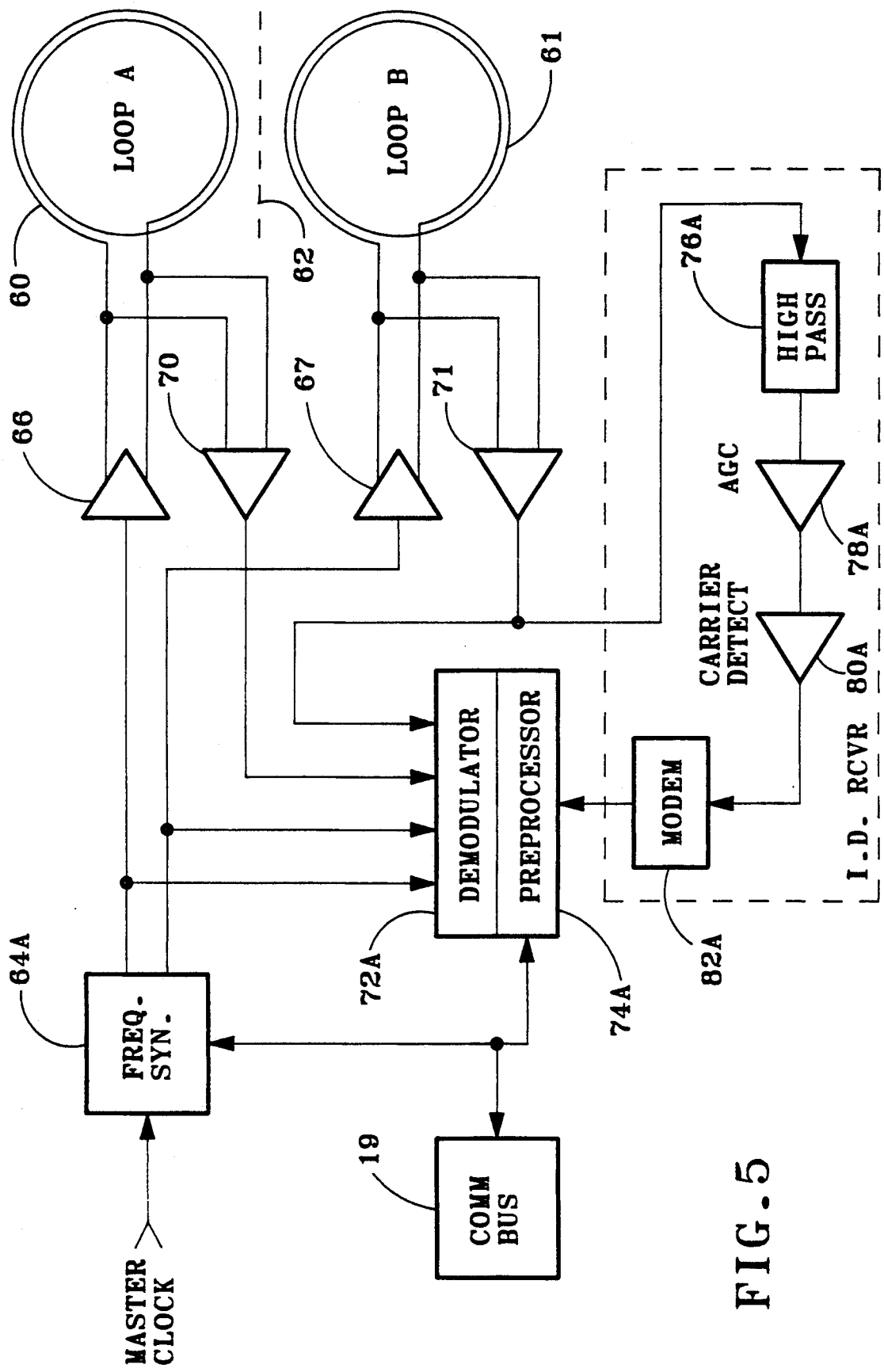
FIG. 5 is a functional block diagram of a first type of vehicle proximity sensor, an "inductive" sensor.

Referring to FIG. 5, illustrated is one of a plurality of a first type of proximity sensing circuits exciting a pair of inductive sensors, 60 and 61, disposed on either side of the center 62 of a vehicle path, such as a road, runway, taxiway and the like. As illustrated the inductive sensors are loop antennas, and these antennas are buried beneath or embedded in the path material. A programmable frequency synthesizer 64A generates a stable sine wave signal of controlled amplitude which is communicated to a pair of drivers amplifiers, 66 and 67, which in turn excite the loops, 60 and 61 respectively, by either a constant rms current or voltage sine wave at a selected frequency. The frequency of the sine wave is selected by information received via a communication bus 19, and this information is communicated to the frequency synthesizer which is, as indicated before, programmable. Thus the frequency used by each such sensing circuit can be selected at will by a remote system supervisor station. A reference clock signal ("MASTER CLOCK") Is communicated to, and used by, the frequency synthesizer to produce the sine wave so that there is a stable relationship between the synthesized frequency and reference clock. This ensures that the frequencies of different units do not drift in relation to each other. Drifting can cause beat frequencies to be generated which would adversely effect the overall system as described herein.

Referring again to FIG. 5, a pair of receiver amplifiers; 70 and 71, communicate with the loop antennas, 60 and 61 respectively, and sense and amplify the signals present in the loops. These amplified signals are communicated to a demodulator 72A which compares the phase of each loop signal to the phase of a corresponding frequency synthesizer input. This information is normalized by the preprocessor 74A based on calibration information preprogrammed in its memory, and the normalized information is communicated to the system supervisor for further processing and display if appropriate. An advantage of using a preprocessor is evident when the magnetic environment ambient to a sensing circuit changes due to such things as new construction or runway control signals near a sensor. In such a case the system supervisor can reprogram the calibration information in the preprocessor memory via the communications link without physical intervention.

Referring again to FIG. 5, the sensing circuit serves a dual function. It functions as a proximity sensor as described above, but it also functions as a signal receiver. One or both of the loop antennas can be used as a receiving antenna for signals from vehicles, signals containing information such as identification and status which can be used by the system supervisor to clarify the situation and location of vehicles. Preferably the signals comprises one or more very low frequency carriers with the information encoded thereon using a technique such as frequency shift keying (FSK). The carrier or carriers are very low frequency to minimize the range of radiation preferably to the point where the sensing circuit is responsive only to a transmitting vehicle in close proximity to the loop antenna. Also, the carrier frequencies are detectably distinct from the guide element and proximity sensor frequencies so as to avoid interference.

As illustrated, a signal impinging one of the loop antennas 61 is processed by an amplifier and thereafter by a bandpass filter 76A. The processed signal is then conditioned by an automatic gain control (AGC) circuit 78A and any carrier signal or signals are extracted by a carrier detector circuit 80A (CARRIER DETECT). The carrier signals are decoded by a modem circuit 82A, which uses conventional techniques to convert the carrier FSK signals to binary information. The modem communicates the binary information to the preprocessor 74A which formats it, if needed, and transmits it to the system supervisor via the communication link.

In operation the inductive sensor circuits excite two loop antennas placed on either side of the center of the runway (or taxiway) with a stable sine wave. By examining the phase relationship between current and voltage in each of these antennas, the "Q" of each can be determined. A reduction in antenna Q will be indicative of the presence of a nearby metallic mass, i.e. an aircraft and the differential change in between the antennas will measure how well this aircraft is centered on the runway. The magnitude of the change of antenna circuit Q for a given distance and configuration will be a function of the size of the detected aircraft.

Figure 6:
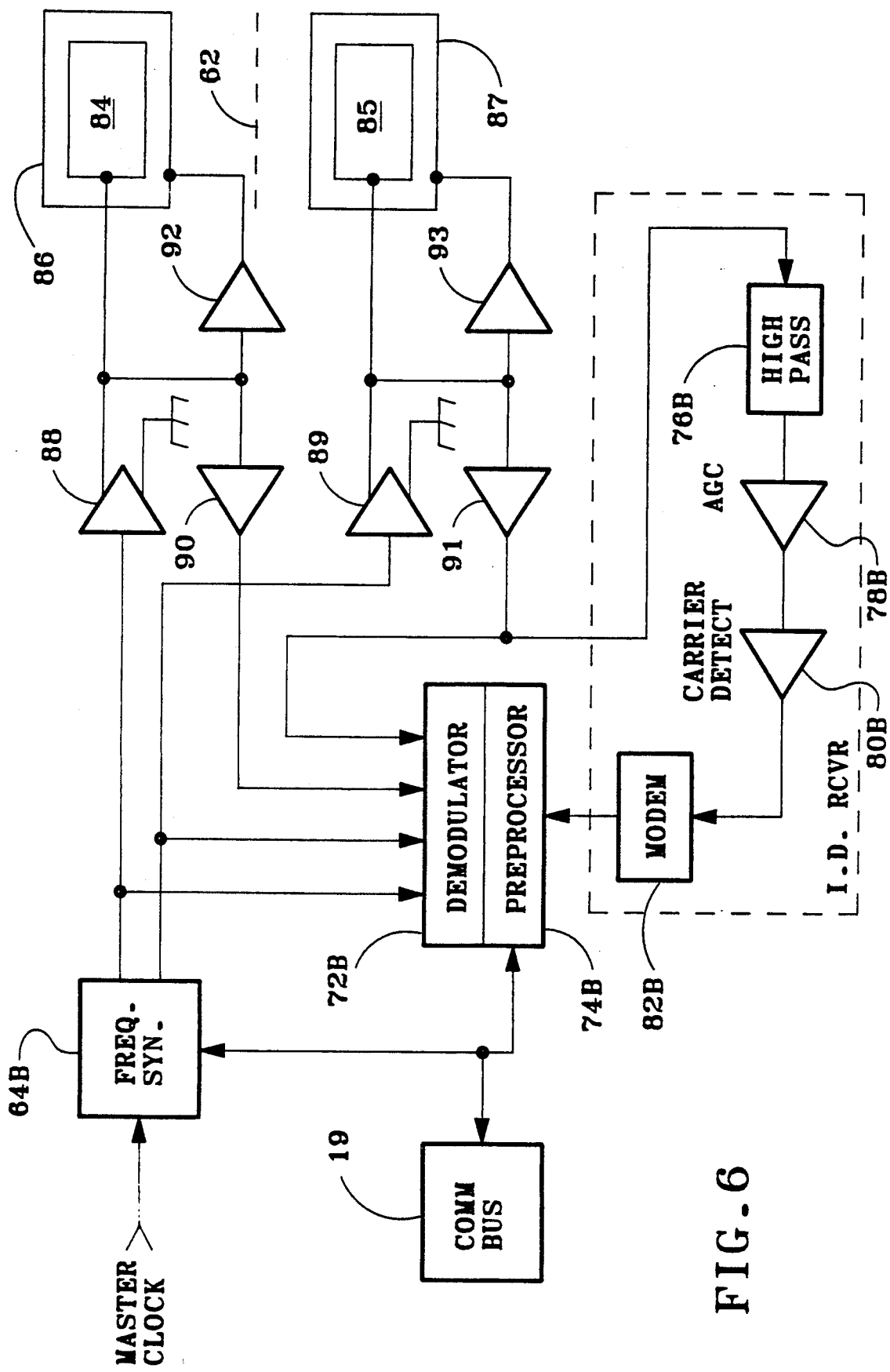
FIG. 6 is a functional block diagram of a second type of vehicle proximity sensor, a "capacitive" sensor.

Referring to FIG. 6, illustrated is one of a plurality of a second type of proximity sensing circuit having a pair of capacitive sensors, 84 and 85, disposed on either side of the center 62 of a surface vehicle path, such as a road, runway, taxiway and the like. As illustrated the capacitive sensors are plates, and these plates are buried beneath or embedded in the path material generally parallel to the surface of the vehicle path. A programmable frequency synthesizer 64B generates a stable sine wave signal of controlled amplitude which is communicated to a pair of drivers amplifiers, 88 and 89, which in turn excite the plates, 84 and 85 respectively, by either a constant rms current or voltage sine wave at a selected frequency. The frequency of the sine wave is selected by information received via a communication bus 19, and this information is communicated to the frequency synthesizer which is, as indicated before, programmable. Thus the frequency used by each such sensing circuit can be selected at will by the system supervisor. As in the inductive sensors, a reference clock signal ("MASTER CLOCK") is communicated to, and used by, the frequency synthesizer to produce the sine wave so that there is a stable relationship between the synthesized frequency and reference clock.

Referring again to FIG. 6, a pair of receiver amplifiers, 90 and 91, communicate with the plates, 84 and 85 respectively, and sense and amplify the signals present in the plates. These amplified signals are communicated to a demodulator 72B which compares the phase of each plate signal to the phase of a corresponding frequency synthesizer input and extracts the reactive components thereof. This information is normalized by the preprocessor 74B based on calibration information preprogrammed in its memory, and the normalized information is communicated to the system supervisor for further processing and display if appropriate. The system supervisor can then assess the changes in capacitance and compare it temporally with other signals it is receiving and determine the presence of a vehicle. A differential comparison of the signals from the two adjacent sensors can indicate the degree of centering that aircraft has achieved on the runway. An advantage of using a preprocessor is evident when the electric environment ambient to a second type sensing circuit changes. As in the inductive sensor circuits, the system supervisor can reprogram the calibration information in the preprocessor memory via the communications link without physical intervention.

Referring again to FIG. 6, the capacitive sensing circuit serves a dual function. It functions as a proximity sensor as described above, but it also functions as a signal receiver. One or both of the plates can be used as a receiving antenna for signals from vehicles containing information such as identification and status which can be used by the system supervisor to clarify the situation and location of the vehicles. Preferably the signal comprises one or more very low frequency carriers with the information encoded thereon using FSK, which frequencies are detectably distinct from the guide element and proximity sensor frequencies so as to avoid interference.

As illustrated a signal impinging one of the plates 85 is processed by an amplifier and thereafter by a bandpass filter 76B. The processed signal is then conditioned by an automatic gain control (AGC) circuit 78B and any carrier signal or signals are extracted by a carrier detector circuit 80B (CARRIER DETECT). The carrier signals are decoded by a modem circuit 82B, which uses conventional techniques to convert the carrier FSK signals to binary information. The modem communicates the binary information to the preprocessor 74B which formats it, if needed, and transmits it to the system supervisor via the communication link.

The basic principal of the capacitive proximity sensor is measurement of the capacitance change between two capacitor plates (e.g. 84 and 85 of FIG. 6) in the presence of a nearly conductive or dielectric mass of material. Two principals are involved in altering the capacitance of the plates. In the case of a metallic object the metal mass shortens the path of the field lines and effectively decreases the electrical distance between the capacitor plates and ground and thereby increases the total capacitance. The detection of nonconductive objects relies on the detected object having a different dielectric constant than the normal surroundings. If the normal environment is air, having a dielectric constant near 1.0, then any solid material would increase the mean dielectric constant and consequently the system capacitance.

Although potentially more sensitive than the inductive system, the capacitive sensor is more susceptible to environmental effects and therefore prone to false signals. The primary source of error is atmospheric changes that effect the electrical environment in the vicinity of the sensor. Among these sources of interference is rain, snow, fog and rapid changes of air temperature or humidity. Most of the effects of these phenomena can be nullified by comparing the behavior of adjacent sensors and by comparing sensor output with predetermined computer signatures of true aircraft encounters. For maximum reliability, the capacitive sensor should always be used in conjunction with the more stable inductive sensors.

Figures 8, 9:
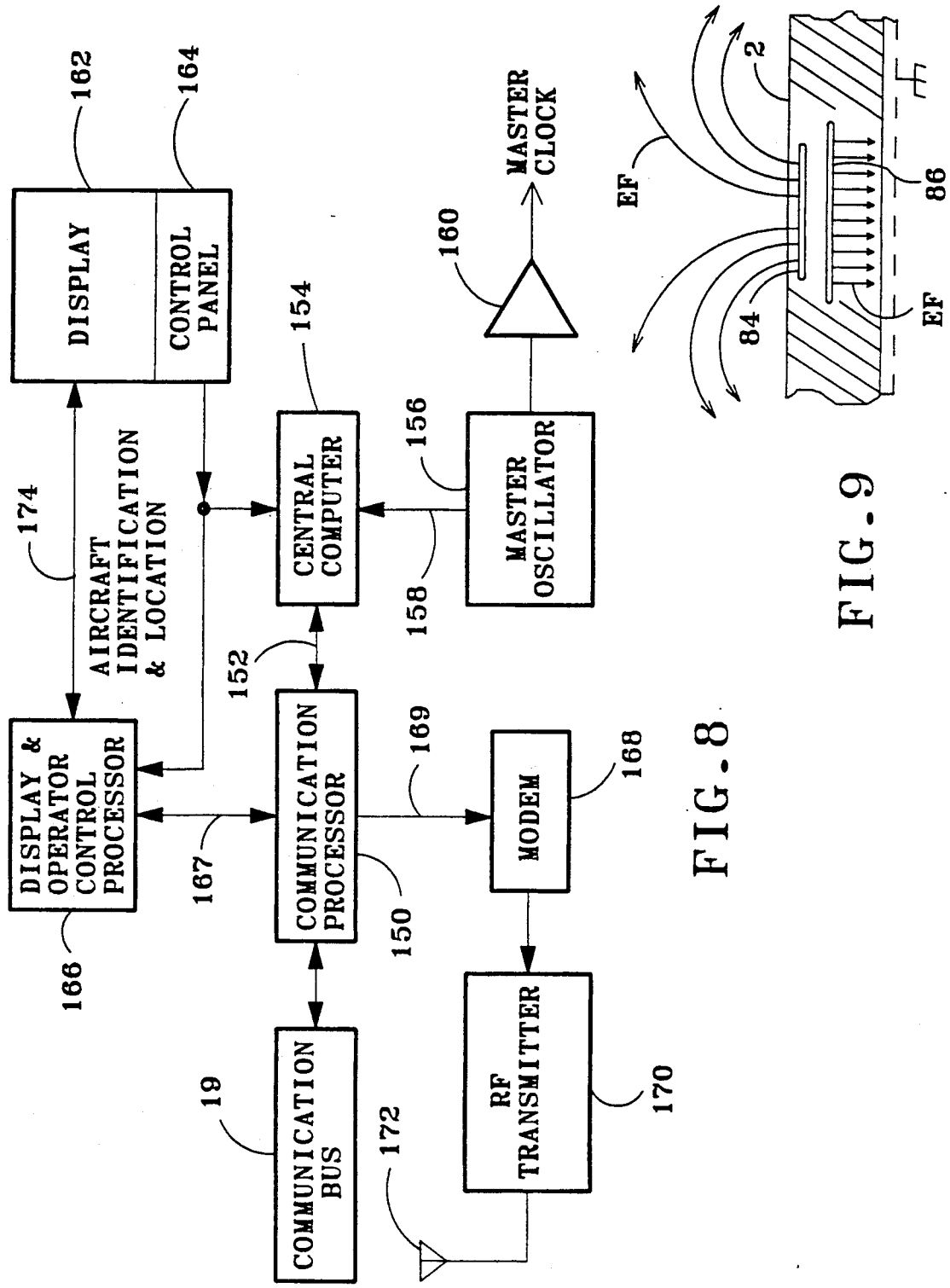
FIG. 8 is a functional block diagram of a system supervisor according to this invention.
FIG. 9 is a sectional view illustrating a preferred relation between capacitive sensor plates and their associated "guard" plates beneath a vehicle path.

Referring to FIGS. 6 and 9, a capacitive sensor plate 84 is seen edge-wise disposed beneath the surface of a runway (such as the runway 2 of FIG. 1). Beneath the capacitive plate and spaced apart therefrom is disposed a parallel guard plate 86. On the opposite side of a guide element 62 is a cooperating second capacitive plate 85 and guard plate 87. Without such guard plates the ground beneath the plates would have the greatest effect on the overall capacitance of the two sensor plates 84 and 85. A much greater portion of the reactive current would flow through the ground than in the volume above the sensor plates where a vehicle would be detected, and only a small portion of the capacitive effect can be utilized. This is clearly the opposite of the desired effect. The guard plates shield the capacitive effect on the underside of the sensor plates by following or "bootstrapping" the field of this space with a signal that is a derivative of the sensor plates' voltage. This technique is well known in the art and is frequently used to subtract undesired capacitance from circuits and components. As a result, total capacitance of the sensor plate to ground is reduced and the majority of the remaining capacitance follows the field lines EF above the runway. This technique not only increases the sensitivity of the sensor in the desired direction, but decreases the effects of subterranean environmental changes such as temperature and ground water level.

Figure 7:
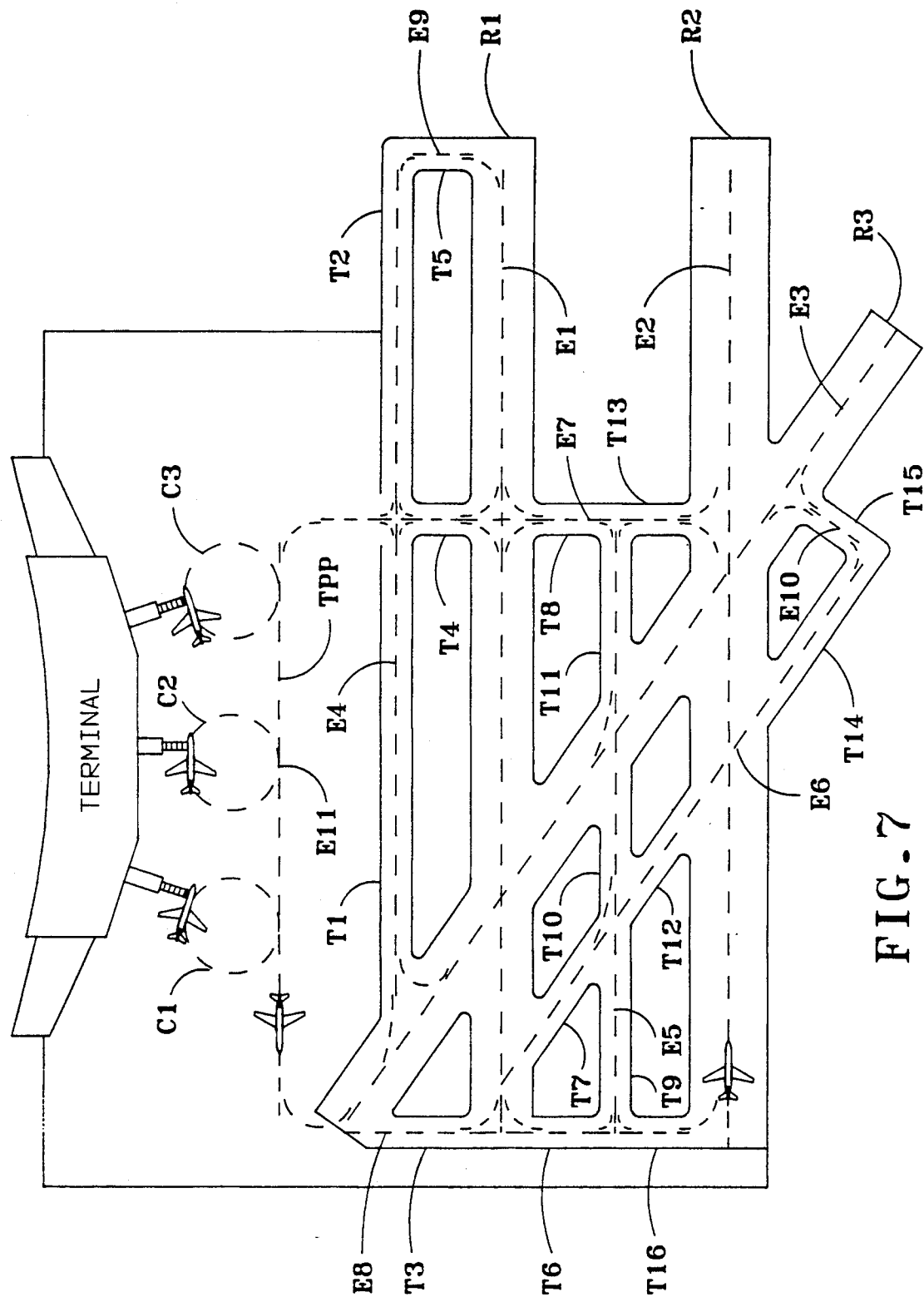
FIG. 7 is a plan view of a typical airport illustrating the layout of radiating guide elements according to this invention.

Referring to FIGS. 7 and 10, a more complex network of paths is illustrated as a typical airport with guide elements embedded in the runways, taxiways, turns and terminal pads. Illustrated are three runways, R1, R2 and R3. Intersecting and interconnecting the runways are a plurality of taxiway segments, T1-T15. The three runways, R1-R3 each have a centered linear guide element, E1-E3 respectively. These are guide elements are substantially coextensive with their respective runways. Each of the taxiway segments also have centered linear guide elements. Since taxiways T1 and T2 are collinear, they have a common centered linear guide element E4. Likewise since taxiway segments T9, T10 and T11 are collinear, they have a common centered linear guide element E5. Likewise, taxiway segments T7, T12 and T14 are co-linear and so they have a common centered linear guide element E6. Likewise, taxiway segments T4, T8 and T13 are collinear and they have a common centered linear guide element E7. Taxiway segments T3-T6 and T16 are co-linear and share a common guide element E8. Taxiways T5 and T15 have separate guide elements E9 and E10, respectively. As illustrated, there are plurality of turn guide elements for guiding vehicles through turns from one path onto another path. In an airport network, the disposition of these turn guide elements depend on the surface travel pattern of the airplanes. For example, there are no turn guide elements at the intersection of runway R1 and runway R3 since it is bad practice for an airplane to turn from one runway onto another.

Also illustrated in FIG. 7 are a plurality of circular guide elements C1-C3 and a terminal pad peripheral guide element TPP tangential to the circular elements for guiding landed aircraft back and forth between the airfield and passenger loading/unloading docks of the terminal. As illustrated, aircraft traverse the path defined by the TPP element from right to left, and can exit from and return to the TPP path by traversing the circular paths clockwise, stopping at respective passenger docks as needed.

Referring to FIG. 10, a portion of the airport illustrated in FIG. 7 is shown in greater detail. This portion is the four-way intersection I1 where taxiways T4 and T8 meet runway R1, and the three-way intersection I2 where taxiways T8, T11 and T13 meet. This Figure is illustrative of the disposition of pairs of inductive sensors and capacitive sensors, as illustrated in FIGS. 5 and 6 respectively, along guide elements E1, E5 and E7. The inductive sensors are illustrated as circles and the capacitive sensors are illustrated as squares. A first pair of inductive sensors, 60A and 61A, are disposed on opposite sides of the guide element E1 and are equidistant therefrom. Spaced further along the guide element are a first pair of capacitive sensors, 84A and 85A, likewise disposed on opposite sides of the guide element and equidistant therefrom. Spaced from the first pair of capacitive sensors is a second pair of inductive sensors, 60B and 61B, likewise disposed on opposite sides of the guide element and equidistant therefrom. Further along the guide element is a second pair of capacitive sensors, 84B and 85B, likewise disposed on opposite sides of the guide element and equidistant therefrom. In this fashion, pairs of inductive proximity sensors and capacitive proximity sensors in a generally alternating sequence are distributed along all guide elements.

Referring again to FIG. 10, also illustrated in greater detail are turn guide elements which are curvilinear and which, as previously explained, guide the vehicles through turns from one path onto another. The four-way intersection I1 is illustrated as having four turn guide elements, 24A, 24B, 26A, and 26B. These elements combine to help a vehicle negotiate any possible turn at the four-way intersection. Straddling each of these turn guide elements is at least one pair of inductive proximity sensors, although optionally there could be capacitive sensors or any combination of inductive and capacitive sensors straddling the turn elements. The number and placement of the sensor pairs primarily depends on the size of the turns involved. Also in the center of the four-way intersection is a pair of diagonally oriented proximity sensors, illustrated as inductive proximity sensors, these are so oriented to avoid any discontinuity of proximity sensor distributions along the intersecting guide elements E1 and E7. The three-way intersection I2 is illustrated as only having two turn guide alements, 24C and 26C. That is because there are only two possible ways to turn at such an intersection. Note that there are proximity sensor pairs straddling each of these turn guide elements as in the other intersection.

Referring again to FIG. 10, the four way intersection I1 has only two stop antennas, S1 and S2, located on T4 and T5, respectively, near where these taxiways meet the runway R1. These are the only two needed since generally any traffic on a runway always has the right of way. Whereas in the three-way intersection I2 there are three stop antennas, S3-S5, corresponding to the three meeting taxiways. These stop antennas, S1-S5, are "stop" and "start" indicators much the same as conventional traffic lights, and each is disposed and separately energized as described above for the stop antenna 23 of FIGS. 1 and 11.

Referring to FIG. 12, illustrated are two collinear guide elements, 4A and 4B, each driven by a separate excitation module. This is to illustrate that guide elements, such as E1 and E7 illustrated in FIG. 10, can actually comprise a plurality of collinear segments preferably with corresponding ends meeting in close proximity. If all of the collinear segments are radiating in phase and at the same frequency, and same modulation if appropriate, then the collinearly arranged segments will appear to a surface vehicle as a continuous guide element. One purpose of segmenting the guide elements is to avoid problems which may be associated with very long runs of guide elements.

Referring to FIGS. 4-6, the system interface transmitters which communicate with the ID receivers of FIGS. 5 and 6, are part of the vehicle's electronics illustrated in FIG. 4. A vehicle system clock provides a clock to a frequency synthesizer (FS) 100 which synthesizes a VLF carrier 101. This carrier is communicated to a modulator 102 and is modulated therein by a data signal 104 from the modem 53. This data signal is preferably encoded using conventional keying techniques such as frequency or phase shift keying. The data signal contains the vehicle identification information from the computer and may contain other information such as vehicle status. The output of the modulator is a modulated VLF carrier 106 which is communicated to an amplifier 108 which in turns energizes a VLF loop antenna 110. In this way, the ID information and other information are communicated from the vehicle to the ID receivers of the inductive and capacitive sensors of FIGS. 5 and 6, respectively.

Referring again to FIG. 4, the VLF loop antenna 110 also picks-up as a signal the frequency radiated by the inductive and capacitive sensors and feeds this signal to a receiver amplifier 112 which amplifies it communicates it to a bandpass filter 114, the bandpass being centered on the sensor frequency. The filtered signal is communicated to an amplifier 116 which in turns communicates the amplified filtered signal to a Schmidt trigger amplifier 118. The output of the Schmidt trigger amplifier is communicated to the computer as high priority interrupt.

In operation, as a vehicle passes over a capacitive or inductive sensor, the vehicle's VLF antenna picks up the sensor frequency which causes an interrupt to be generated in the computer. The computer in servicing the interrupt realizes that it is passing over a sensor and so it communicates the identification and preferably status information to the modem and actuates the modem to transmit this information to the modulator 102 which correspondingly modulates the VLF carrier being transmitted via the vehicles' loop antenna preferably in a burst. The receiver circuit of the proximity sensor over which the vehicle is passing receives this transmission. In this way, the passage of the vehicle over each proximity sensor triggers a transmission of the vehicle's identification, and optionally status information, to the sensor which in turns communicates it to the system supervisor via the communication bus 19 (See FIGS. 5 and 6).

When there is an emergency situation at an airport employing the system according to this invention, airplanes on the ground can all be stopped immediately by changing the normal guide element frequency to a designated stop frequency. This would have the effect of freezing all aircraft and surface vehicles in their tracks. However, it may be desirable to more orderly "stack" the airplanes. On runways and taxiways not affected by the emergency the guide elements, frequencies could remain unchanged, but the vehicles would be stopped by the inductive and/or capacitive sensors. This can be accomplished by action of the system supervisor to change the frequencies emanating from proximity sensors to the stop frequency in response to receiving identification information from aircraft passing over the sensors. In other words, an aircraft would be allowed to continue along the guide element of an unaffected runway or taxiway until it encountered a proximity sensor. At that time the aircraft would, as in normal operation, transmit its identifying information to the sensor which would in turn send that information to the system supervisor. The system supervisor would then cause the sensor's operating frequency to change to the stop frequency which would cause the vehicle to stop on or shortly past the sensor. In this way, aircraft could be stacked at the spaced sensor points (preferably at least 100 feet apart) and the system supervisor would know the identity of each aircraft stacked at each sensor point.

Figure 13:
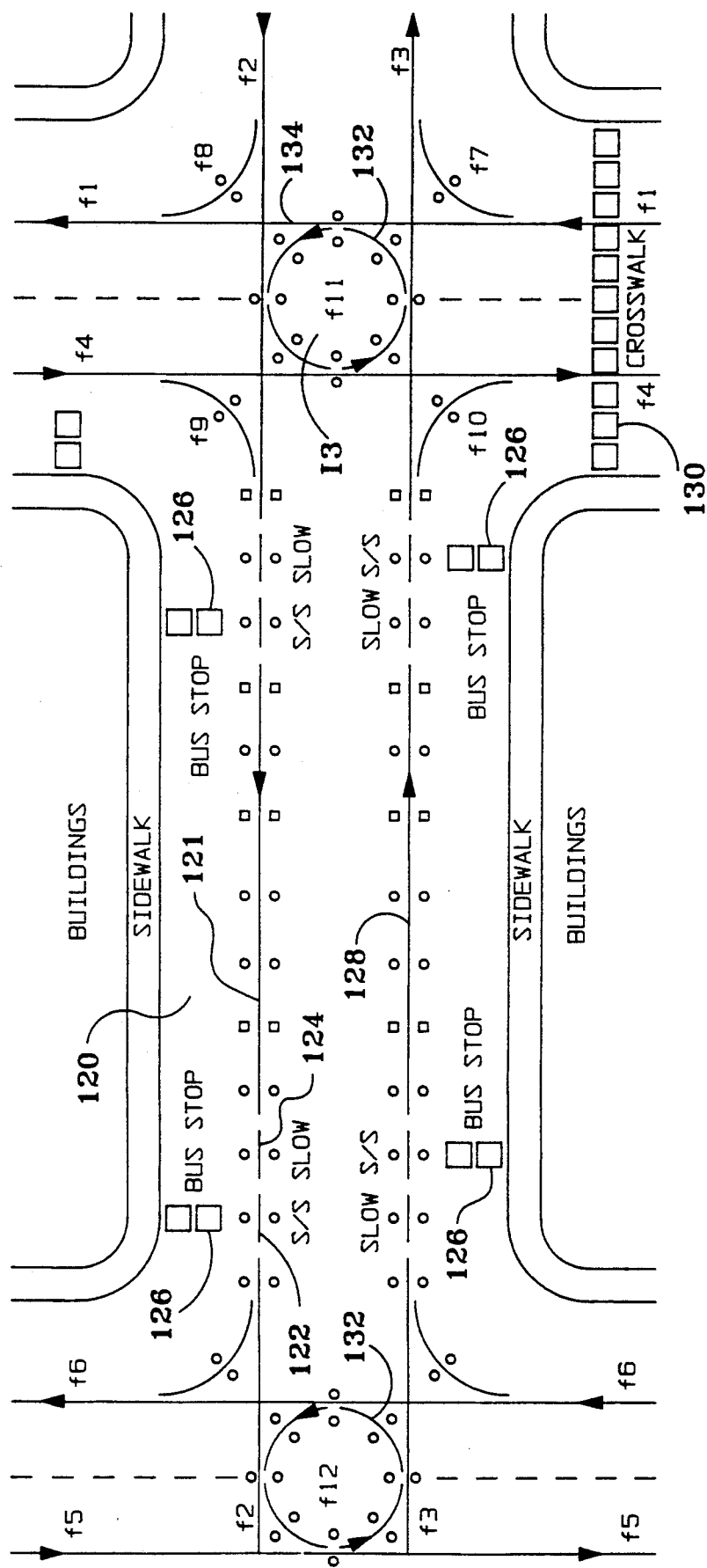
FIG. 13 is a plan view of the layout of a typical metropolitan street with the guide elements, proximity sensors, and control elements installed along prescribed routes.

Referring to FIG. 13, illustrated is an embodiment of this invention for a city street 120. The surface traffic control system as applied to vehicular traffic would use the same components as in the airport system, but with variations. In addition to stop/start antennae 122, there would also be antennae 124 for giving "slow" signals. Preferably two short antennas are in a row: the first for radiating a "slow" signal when appropriate, and the second for radiating stop/start signals. The first (i.e. slow) antenna preferably radiates a frequency that is the same as the frequency radiated by the guide element but when the presence of passengers is sensed by nearby proximity sensors 126, the signal emanating from the slow antenna becomes modulated by a signal indicative of a slow-down condition. At the same time, the stop signal would be on, and remain so, until the bus stopped.

Motion sensors (not shown), such as infrared or ultrasonic, are disposed in the bus' doors (not shown) to detect the movement of passengers through the doorways, and as the ground passenger sensors 126 clear (from the passengers leaving the ground by entering the bus) the door sensors will hold the doors open and the bus stopped until all motion ceased in the doorways. At that point a bell or horn rings indicating that the doors are to close. After several seconds delay the door will close. The doors are soft controlled mechanisms, with a door edge sensor (compressible air tube communicating with an air pressure switch) kicking the door open if something is caught in the door. With the door clear, the bus is then enabled to start, if the stop signal has switched to start.

The front of the bus should have inductive, capacitive, and/or sonic sensors operating when the bus is in motion for stopping the bus when something is in the way.

Preferably there are two parallel guide elements along the street 120. One guide element 121 for buses traveling in one direction, and another 128 for buses traveling in an opposite direction. As in the airport system, a carrier frequency can be used for guiding a vehicle along a street guide element but additionally, modulation can be used for speed control. Since all mechanical systems have slight variations in their operation, a radio signal from a system supervisor preferably fine tunes the speed control. If two buses are on the same block and one is gaining on the other even though they are receiving the same speed/modulation information, the system supervisor would be aware of the speed difference from passage of the buses over proximity sensors and can adjust the fine speed control of the faster bus slowing it down.

Preferably there are capacitive sensors 130 disposed in sequence across the entire width of the street at each pedestrian crossing. They can be used to stop buses when pedestrians are crossing. Preferably the system supervisor also controls traffic lights in the network to coordinate them with the radiated stop/start signals.

As illustrated in FIG. 15, preferably there are calibration capacitive sensors 140 mounted on light posts 142 throughout the system to sample the dielectric constant of the ambient air in order to allow the control computer to calibrate from time to time the capacitive proximity sensors.

In the center of street intersections, there would be left-hand guide elements 132 formed in a full circle. They can all be operated at the same frequency since a turning bus would follow the turn signal that was branching in a forward direction and would immediately lose the signal that was to the rear of the turn. When the bus completes a quarter turn the new frequency will be sensed as next in sequence of the routing frequencies.

For example, a bus following frequency f3 of guide element 128 to the intersection 13 containing the f11 turn frequency circle would follow f11 through a quarter turn onto the f1 frequency of an intersecting guide element 134 and the left-hand turn would be completed.

It can be seen that this system can be used to eliminate all traffic from high density business areas and use city buses to automatically move everyone within the enclosed area. Assume that you wished to cut off traffic from the loop in Chicago. Around the perimeter of the loop you could build automatic storage depots for cars in sufficient quantity to hold al the cars of the loop employees and all potential shoppers. The parking fees would allow the car owners to enter the loop. At that point the automated bus routes would allow everyone to go any place within the loop. Shoppers could spend all day shopping and browsing through the stores while catching buses between stores. The buses would not require fare because the parking fees would be set to cover the bus costs.

In this type of system, the buses preferably should be electrical powered. Diesel or gasoline exhaust fumes could interfere with the capacitive pedestrian sensors because of the particles that the gasses put in the air. Also, the system can be used without automatic control of buses. The system can be used for traffic control with the drivers using on-board readouts in much the same way pilots do. In a totally automatic system there would be a manual overrides for emergencies.

FIG. 8 illustrates the electronics of the system supervisor that controls the frequencies and modulation of all guide elements, capacitive and inductive sensors, and locomotion control antennae such as the start, stop, and slow antennas. This communication is accomplished via the communication bus 19 linked to a communication processor 150. In operation the communication processor scans the communication bus looking for key interrupt request codes from the proximity sensors. Each request code signifies that a corresponding sensor has detected a vehicle and preferably has received ID information from the vehicle and further signifies the type of information to be sent, for example, the vehicle detected, the vehicle's identification code, and the like. If more than one sensor is requesting an interrupt, the communication processor assigns priorities to each sensor per the type of communication identified by the request code. Via an interface 152 the communication processor sends these interrupts to a central computer 154. The communication processor is also in data communication with the central computer via the same interface. A master oscillator 156 provides a primary clock 158 to the central computer and also provides a corresponding master clock to all major system components needing a clock, such as the proximity sensor circuits. A master clock distribution network 160 provides necessary amplification and time delays so that the clock received by these various components of the system are all in proper phase relationship, albeit delayed in time depending on the remoteness of the components. For example, a remote component may receive a master clock in phase with the master oscillator but delayed "X" amount of time, whereas another component half as remote may receive a master clock also in phase with the master oscillator, but delayed X/2 amount of time. It should be noted that these delays are effectively felt only during the start-up of the system. Once all the components have received a clock in proper phase relation during initiation, they can thereafter be operated synchronously because the master clocks they receive are all in proper phase relation to the master oscillator.

Referring again to FIG. 8, the system supervisor also has at least one display 162 and at least one control panel 164. These comprise the operators' interface to the system. Preferably the display has a video map of the traffic network, for example the airfield in an airport embodiment. Continuously superimposed on this map is the location and identification of each vehicle within the network. Preferably the display and control panel are driven by a processor 166 which can receive continuous updates from the communication processor and has the capability of interpolating vehicle positions between sensors. A component of the control panel, such as a keyboard, can also communicate with the central computer. By this keyboard the operator can enter data or override the central computer with manual commands so that in the event of a malfunction of the central computer, the operator will still have the display of the controlled area and control of the system. This is a result of separating the communication processor and the display and control processor from the central computer and providing a link 167 between the communication processor and the display and control processor independent of the central computer.

FIG. 8 also illustrates a data and control link 169 between the communication processor and a modulator/demodulator 168. As previously discussed, the system supervisor can communicate information to vehicles via RF transmissions. For example, this is the means by which the center sends a landing aircraft its itinerary. The modulator/demodulator receives a clock from the master oscillator or has an internal oscillator to produce a carrier signal which is modulated by the data from the communication processor, and this modulated signal is communicated to an RF transmitter 170 and radiated via antenna 172.

In operation, the system supervisor, in an airport embodiment, computes optimum and alternate routes that aircraft may travel to and from the runways. By monitoring the field sensors, any conflicts in routes between aircraft and other aircraft or between aircraft and surface vehicles can be anticipated and avoided by selectively altering guide element frequencies and modulation. For aircraft and ground support vehicles not so equipped, the system can supply warning signals. Via a link 174 between the keyboard of the control panel and the display and operator control processor, a human operator can intervene or override automatic systems being run by the central computer, if conditions so require.

The communication processor preferably handles all routine sensor signals and can display, for the operator, the position of all aircraft and other vehicles on the field. The central control computer preferably performs the higher level functions such as programming the sensor parameters, computing routes and transmitting data to vehicles.

The previously discussed surface traffic control system, and in particular the city street embodiment of FIG. 13 can be extended to provide for automatic control of buses within the controlled area. Preferably, the buses would be automatically controlled to continuously travel in circuitous routes throughout the control area for carrying people from one point in the controlled area to another point in the controlled area.

FIG. 14 illustrates just such an extension. A signal 178 from a guide element carrier modulation detector, such as the detector 46A of FIG. 4, is communicated to a modulation to speed convertor 180 which can be primarily a frequency to voltage converter. The signal from this convertor is amplified through a gate 182 and passes through the normally closed contacts of a switch, generally designated 184, to a throttle control motor which is responsive to the signal. In operation, the signal is preferably an analog signal whose amplitude corresponds to a desired speed. The throttle control motor responds to the analog signal to operate a mechanical linkage to the throttle of an automated bus. Through this path the modulation imposed on a guide element which the bus is following controls the speed of the bus. Since the gains of the paths in each of these buses will probably not match, the speed of each bus will be slightly different for the same modulation. Therefore, each bus is preferably equipped with a circuit 185 which comprises an RF link and means for adjusting the bias of the modulation to speed convertor. By adjusting the bias via corresponding RF signals, the system supervisor can adjust the gain in each throttle control circuit and thereby keep them identical.

Referring again to FIG. 14, each bus will be equipped with a circuit such as illustrated in FIG. 4 by which the bus follows a guide element. Such a circuit necessarily produces an error signal when the vehicle deviates from the guide element. This error signal 190 containing both direction of deviation information (such as the polarity of a voltage) and magnitude of deviation information (such as the magnitude of an analog voltage) is communicated through the normally closed contacts of a switch (generally designated 192) to a steering control motor 194. This steering control motor basically converts the error signal to corresponding mechanical motion through a mechanical linkage 196 causing the steering mechanism of the bus to correct for the deviation from the guide element. Thus, it is by this path the bus automatically maintains its course along the guide element.

Referring again to FIG. 14, the brakes of the bus and the doors of the bus are also automatically controlled via a brake motor 200 with its corresponding mechanical linkage 202 and a door open/close motor 204 and its corresponding mechanical linkage 206, respectively. Both the brake and the door open/closed motors receive actuation signals through normally closed contacts of associated switches, generally designated 208 and 210 respectively. These actuation signals come from a common source which is an "OR" gate 212. One input to the OR gate is a signal 214 which signifies that a stop frequency has been detected, such as the signal from the output of detector 56 of FIG. 4. This signal causes the bus to stop and the doors to open whenever a stop frequency is detected. Another input to the OR gate is a signal 216 signifying that a passenger or passengers are traversing through one or more doors of the bus. This signal causes the brakes to continue to be applied and causes the doors to remain open which is appropriate when passengers are still leaving or entering the bus. A third input 218 to the OR gate signifies the absence of a carrier detect signal. The absence of a carrier detect signal signifies a serious malfunction and will cause the bus to brake and the doors to open. The output of the OR gate is also fed as a gating signal to the speed control gate 182. Thus, if any of the three conditions exist to cause the brakes to be actuated, the de-gating of the throttle control signal will cause the bus throttle to be pulled back. All the switches have normally open (NO) contacts communicating with a manual override. When manual override is actuated, the normally closed (NC) contacts of the switches open and the normally opened contacts of the switches close, all of which transfer control of the motors to manual override.

Basically the "start/stop" antennas and the "slow" antennas, and their respective excitation modules, are all means for controlling the locomotion of the vehicles in contrast to the guide elements which control the directions of the vehicles. While these locomotion control devices have been discussed in the context of stopping, starting and warning a vehicle to slow down because of an impending stop, they can be used to affect other locomotion changes in general, e.g. signals emitting therefrom can correspond to certain vehicle velocities. Moreover, such locomotion controls need not necessarily be placed proximate an intersection of paths. In general, they can be disposed at any point in a path at which the locomotion of approaching vehicles may need to be controlled independent of signals from guide elements.

In general, the itineraries sent to the vehicles comprise at least an ordered set of identifiers each of which corresponds to the signal emitted along a path or turn in a travel route defined by the itinerary. Preferably each set of identifiers is a list of frequencies in the order that a vehicle will encounter following the itinerary. The itineraries can be manually generated and communicated to the system supervisor for sending to the vehicles involved, but preferably they are generated by a system supervisor computer taking into consideration all the vehicle traffic in the network at the time. Alternately or in conjunction therewith, all possible itineraries getting a vehicle from one given location to a given destination can be prestored in a computer accessible library of itineraries. In this case, the task of the system supervisor computer would be to simply pull each possible itinerary for a given location and given destination and pick the beat route or at least the first route found to be acceptable based on many considerations, such as traffic conditions and time constraints.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A system for simultaneously guiding and controlling the travel of a plurality of self-propelled vehicles over respective, prescribed travel routes within a network of one or more predetermined paths of travel comprising:
   (a) guide means, positioned along each network path and along each turn, if any, leading from one network path onto another network path, for emitting signals to guide vehicles along said each network path and said each turn, respectively;
   (b) a plurality of locomotion control means, each disposed at a point in the network at which the locomotion of approaching vehicles may need to be controlled, for emitting signals to control said locomotion;
   (c) a system supervisor comprising means for selectively causing each of said plurality of locomotion control means to emit at least one locomotion control signal; and
   (d) a system interface hosted by each vehicle being guided and controlled comprising:
      (i) means for pre-storing an itinerary pertaining to the host vehicle, each itinerary comprising an ordered set of identifiers each of which corresponds to the signal emitted along a network path or a network turn in a travel route prescribed by said each itinerary, the order of the set indicating the order of network paths and turns, if any, in said travel route,
      (ii) means for indicating for each itinerary the set of identifiers contained therein and the order of the set,
      (iii) means, responsive to the signals emitted by said guide means, for indicating the position of the host vehicle relative to a center of a network path or turn upon which the vehicle is disposed, and
      (iv) means, responsive to said at least one locomotion control signal, for producing a corresponding indication.

2. The system according to claim 1 wherein the system interface further comprises means for detecting each point of transition from one network path or turn to another network path or turn along a travel route, and means, responsive to a detection of a transition point, for indicating a change, if any, required in the course of the host vehicle to follow said another network path or turn.

3. The system according to claim 1 further comprising a plurality of sensors distributed in spaced relation along at least one guide means, each sensor comprising:
   (a) means for detecting the proximity of a vehicle to said each sensor, and (b) means in response thereto for contemporaneously communicating a signal to the system supervisor indicative of said proximity.

4. The system according to claim 3 further comprising:
   (a) means, associated with said each sensor, for emitting a signal,
   (b) means, associated with the system interface, for detecting the signal emitted by said each sensor and, in response thereto, for transmitting a signal to said each sensor corresponding at least to an identification of said host vehicle,
   (c) means, associated with said each sensor, for receiving the transmitted signal, and
   (d) means, associated with said each sensor, for contemporaneously communicating a signal corresponding to said transmitted signal to the system supervisor.

5. The system according to claim 1 wherein said guide means each comprise an electrical conductor positioned along the center of a network path or turn, and means, associated with each conductor, for exciting said each conductor to radiate a signal corresponding to said network path or turn.

6. The system according to claim 1 wherein the signal emitted by each of said guide means comprises a radiated sine wave having a frequency.

7. The system according to claim 6 wherein the signal emitted by each of said guide means further comprises a signal modulating the sine wave.

8. The system according to claim 7 wherein said guide means each further comprise means, programmable by the system supervisor, for selectively setting the frequency of the sine wave and a frequency of the modulating signal.

9. The system according to claim 1 wherein the signal emitted by each locomotion control means comprises a radiated sine wave having a frequency.

10. The system according to claim 2 wherein the locomotion control means further comprises means, programmable by the system supervisor, for selectively setting the frequency of the sine wave and a frequency of the modulating signal.

11. The system according to claim 2 further comprising a plurality of sensors distributed in spaced relation along at least one guide means, each sensor comprising:
    (a) means for detecting the proximity of a vehicle to said each sensor, and
    (b) means in response thereto for contemporaneously communicating a signal to the system supervisor indicative of said proximity.

12. The system according to claim 11 further comprising:
    (a) means, associated with said each sensor, for emitting a signal,
    (b) means, associated with the system interface, for detecting the signal emitted by said each sensor and, in response thereto, for transmitting a signal to said each sensor corresponding at least to an identification of said host vehicle,
    (c) means, associated with said each sensor, for receiving the transmitted signal, and
    (d) means, associated with said each sensor, for contemporaneously communicating a signal corresponding to said transmitted signal to the system supervisor.

13. The system according to claim 2 wherein said guide means each comprise an electrical conductor positioned along the center of a network path or turn, and means, associated with each conductor, for exciting said each conductor to radiate a signal corresponding to said network path or turn.

14. The system according to claim 3 wherein the means for detecting the proximity of a vehicle comprises an inductance circuit, positioned about the center of a network path or turn, having a quality factor that is detectively changed by the proximity of a vehicle to said inductance circuit.

15. The system according to claim 3 wherein the means for detecting the proximity of a vehicle comprises means, positioned about the center of a network path or turn, for producing an electric field transverse thereto, and means for detecting change in the electric field due to the presence of a vehicle therein.

16. The system according to claim 3 further comprising means for selectively emitting a stop signal at said each sensor in order to stack vehicles at such sensors when desired.

17. The system according to claim 4 further comprising:
    (a) means, associated with said each sensor, for selectively setting the signal emitted by said each sensor, and
    (b) means, associated with the system supervisor and responsive to the signal indicative of said proximity, for setting said signal emitted by said each sensor to the stop signal in order to stack vehicles at such sensors when desired.

18. The system according to claim 4 further comprising:
    (a) means, associated with said each sensor, for selectively setting the signal emitted by said each sensor, and
    (b) means, associated with the system supervisor and responsive to said signal corresponding to said transmitted signal, for setting said signal emitted by said each sensor to the stop signal in order to stack vehicles at such sensors when needed desired.

19. The system according to claim 1 further comprising:
    (a) first locomotion control means, disposed at at least one point in the network where an approaching vehicle may have to be stopped, for emitting a stop signal when the vehicle should be stopped,
    (b) second locomotion control means, disposed at at least one point preceding, with respect to the direction of an approaching vehicle, the first locomotion control means,
    for emitting a slow signal at least when the first locomotion control means is emitting a stop signal, and
    (c) means, associated with the system interface hosted by said vehicle and responsive to said stop and slow signals, for indicating same.

20. The system according to claim 9 wherein the signal emitted by each locomotion control means further comprises a signal modulating the sine wave.

21. The system according to claim 1 wherein said means for pre-storing an itinerary comprises:
    (a) means, associated with the network supervisor, for sending to said vehicles their respective itineraries,
    (b) means, associated with the system interface, for acquiring an itinerary pertaining to the host vehicle sent by the network supervisor.

22. The system according to claim 1 further comprising:

(a) at least one pedestrian crossing of a vehicle path,
(b) means for detecting the presence of a pedestrian on said at least one pedestrian crossing,
(c) means for communicating said presence to the system supervisor,
(d) locomotion control means disposed in said vehicle path of travel proximately preceding said at least one pedestrian crossing, and
(e) means, associated with said system supervisor and responsive to the signal indicative of the presence of a person on said at least one pedestrian crossing, for selectively causing said locomotive control means to emit a signal indicative to a vehicle to stop before said at least one pedestrian crossing.

23. The system according to claim 22 wherein said means for detecting the presence of a pedestrian comprises a plurality of linearly spaced means each for producing an electric field transverse to the pedestrian crossing, and means, associating with each linearly spaced means, for detecting change in the electric field due to a proximity of a pedestrian thereto.

24. The system according to claim 22 further comprising:
(a) a second locomotion control means disposed in said vehicle path of travel a distance before said at least one pedestrian crossing, and
(b) means, associated with said system supervisor and responsive to the signal indicative of the presence of a person on said at least one pedestrian crossing, for selectively causing the second locomotion control means to emit a signal indicative to the vehicle to decelerate through said distance in order to stop before said at least one pedestrian crossing.

25. The system according to claim 1 further comprising:
(a) at least one area adjacent a vehicle path of travel at which persons board vehicles,
(b) means for detecting the presence of a person on said area,
(c) means for communicating a signal indicative of said presence to the system supervisor,
(d) locomotion control means disposed in said vehicle path of travel proximately preceding said area, and
(e) means, associated with said system supervisor and responsive to the signal indicative of the presence of a person on said area, for selectively causing said locomotion control means to emit a signal indicative to a vehicle to stop adjacent said area.

26. The system according to claim 25 wherein said means for detecting the presence of a person on said area comprises means for producing an electric field transverse to said area, and means for detecting change in the electric field due to the proximity of said person thereto.

27. The system according to claim 25 further comprising:
(a) a second locomotion control means disposed in said vehicle path of travel a distance before said area, and
(b) means, associated with said system supervisor and responsive to the signal indicative of the presence of a person on said area, for selectively causing the second locomotion control means to emit a signal indicative to the vehicle to decelerate through said distance to stop adjacent said area.

28. The system according to claim 1 wherein the system interface hosted by at least one vehicle further comprises:
(a) means, responsive to the signals emitted by said guide means, for producing a signal corresponding to errors in the position of said at least one host vehicle relative to said guide means, and
(b) means, responsive to said signal corresponding to errors, for controlling the steering of said at least one vehicle to continuously minimize said errors.

29. The system according to claim 1 wherein:
(a) the signal emitted by at least one guide means comprises a carrier signal and a modulating signal, said modulating signal corresponding to a speed at which at least one vehicle following said at least one guide means should travel,
(b) means, associated with said system supervisor, for selectively transmitting to said at least one vehicle and
(c) wherein the system interface hosted by said at least one vehicle further comprises:
 (i) means for converting the modulating signal to a speed control signal,
 (ii) means for acquiring the signal corresponding to an adjustment to said speed,
 (iii) means, responsive to said signal corresponding to an adjustment to said speed, for correspondingly biasing said speed control signal, and
 (iv) means, responsive to said speed control signal and said biasing, if present, for setting the speed of said at least one vehicle accordingly.

30. The system according to claim 1 wherein:
(a) said signals to control locomotion further comprise a stop signal indicative to a vehicle to decelerate to a stop, and
(b) the system interface hosted by at least one vehicle further comprises means, responsive to said stop signal, for causing the vehicle to decelerate to a stop.

31. The system according to claim 30 wherein the system interface hosted by said at least one vehicle further comprises:
(a) means for detecting the absence of signals emitted by said guide means, and
(b) means for causing the vehicle to decelerate to a stop whenever said absence is detected.

* * * * *